US010216649B2

(12) United States Patent
Tsirkin et al.

(10) Patent No.: US 10,216,649 B2
(45) Date of Patent: Feb. 26, 2019

(54) KERNEL TRANSITIONING IN A PROTECTED KERNEL ENVIRONMENT

(71) Applicant: Red Hat Israel, Ltd., Raanana (IL)

(72) Inventors: Michael Tsirkin, Raanana (IL); Paolo Bonzini, Milan (IT)

(73) Assignee: RED HAT ISRAEL, LTD., Ra'anana (IL)

( * ) Notice: Subject to any disclaimer, the term of this patent is extended or adjusted under 35 U.S.C. 154(b) by 156 days.

(21) Appl. No.: 15/056,059

(22) Filed: Feb. 29, 2016

(65) Prior Publication Data
US 2017/0249263 A1    Aug. 31, 2017

(51) Int. Cl.
G06F 12/14        (2006.01)
G06F 9/455        (2018.01)
G06F 12/1009      (2016.01)
G06F 21/53        (2013.01)

(52) U.S. Cl.
CPC ...... G06F 12/1433 (2013.01); G06F 9/45558 (2013.01); G06F 12/1009 (2013.01); G06F 21/53 (2013.01); G06F 2009/45562 (2013.01); G06F 2009/45583 (2013.01); G06F 2212/1052 (2013.01); G06F 2212/65 (2013.01)

(58) Field of Classification Search
None
See application file for complete search history.

(56) References Cited

U.S. PATENT DOCUMENTS 7,594,139 B2    9/2009  Nellitheertha
8,433,890 B2    4/2013  Arditti et al.
8,505,003 B2    8/2013  Bowen
8,719,559 B2    5/2014  Aloni et al.
9,063,821 B1    6/2015  Emelyanov et al.
(Continued)

FOREIGN PATENT DOCUMENTS

CA    2831194 A1 * 10/2013
CN    104461645 A    3/2015

OTHER PUBLICATIONS

Gavin Thomas, "Kernel 3.18 Development—The Kernel Column", http://www.linuxuser.co.uk/news/kernel-3-18-development-the-kernel-column, accessed Dec. 23, 2015, 2 pages.
(Continued)

*Primary Examiner* — Joseph P Hirl
*Assistant Examiner* — Hassan Saadoun
(74) *Attorney, Agent, or Firm* — Haynes and Boone, LLP

(57) ABSTRACT

Methods, systems, and computer program products are included for providing one or more additional kernels kernel in a protected kernel environment. A method includes providing, by a hypervisor, a virtual machine that includes a first kernel. A first portion of memory of the virtual machine is allocated for the first kernel and a second portion of memory of the virtual machine is allocated for a second kernel. The virtual machine executes the first kernel. The hypervisor disables access privileges corresponding to the second portion of memory. Execution is transitioned from the first kernel to the second kernel by clearing memory corresponding to the first kernel, enabling access privileges corresponding to the second portion of the memory, and executing the second kernel on the virtual machine.

20 Claims, 4 Drawing Sheets

(56) References Cited

U.S. PATENT DOCUMENTS

2008/0148048 A1* 6/2008 Govil ...................... G06F 21/53
  713/164
2011/0271088 A1* 11/2011 Princen ............... G06F 9/45533
  713/2
2014/0281460 A1 9/2014 Friedman et al.
2015/0370592 A1* 12/2015 Tuch ................... G06F 9/45558
  718/1

OTHER PUBLICATIONS

Min Li, "Fast Boot from Linux to Xen Hypervisor by Kexec" http://lists.infradead.org/pipermall/kexec/2009-November/003617.html, Nov. 16, 2009, 1 page.
Vitaly Kuznetsov, "PVHVM Linux Guest Why Doesn't Kexec Work?" http://events.linuxfoundation.org/sites/events/files/slides/seattle2015_xen.pdf, Red Hat Xen Developer Summit, 2015, 18 pages.

* cited by examiner

//KERNEL TRANSITIONING IN A PROTECTED KERNEL ENVIRONMENT

FIELD OF DISCLOSURE

The present disclosure generally relates to memory, and more particularly to systems and methods for providing multiple kernels in a protected kernel environment.

BACKGROUND

Conventional technologies include kernel protection mechanisms. Kernel protection mechanisms allow enforcement of kernel protection measures that prevent portions of the kernel from being executed and/or modified. These mechanisms are useful for thwarting at least some malware and helping to safeguard the integrity of the kernel.

One issue that has arisen is that these kernel protection mechanisms are not compatible with other technologies that require write and/or execute access to the kernel. That is, the kernel protection mechanisms may render other technologies inoperable. For example, the kernel protection mechanisms may prevent particular features from being provided. These issues may result in the kernel protection mechanisms being impractical for use in production environments.

Accordingly, while kernel protection mechanisms may be helpful in some ways, they may also counter useful features that allow users to perform beneficial activities. For example, a user may want to reuse a same memory space to execute more than one kernel. However, due to a kernel protection mechanism, the memory space used to execute a first kernel may be inaccessible for executing a second kernel. Accordingly, the user may be prevented from executing multiple kernels in the memory space.

It would be advantageous to allow memory to be utilized by multiple kernels, while at the same time allowing kernel protection mechanisms to be implemented. The techniques provided herein allow providing multiple kernels and transitioning between the kernels in a protected kernel environment.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
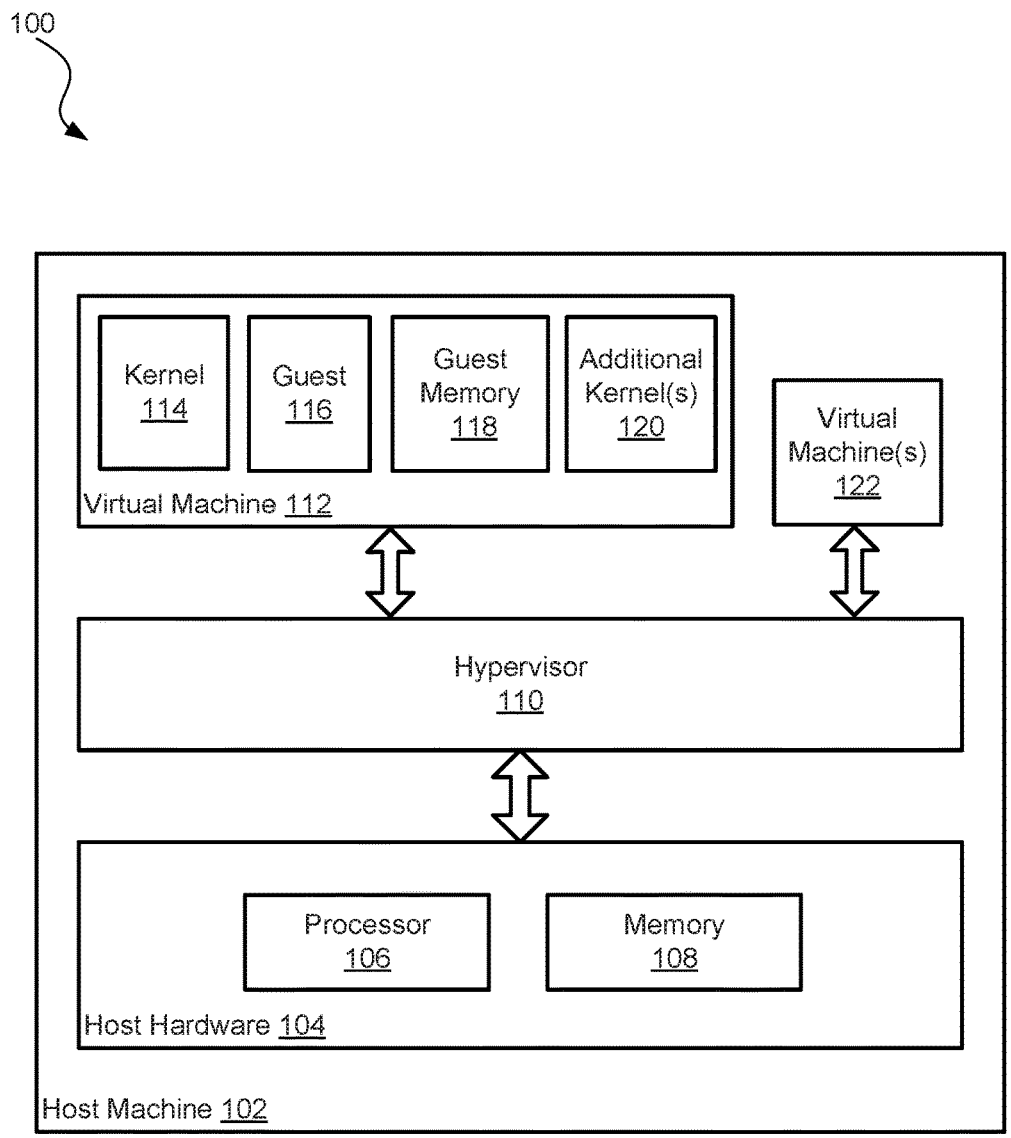
FIG. 1 is an organizational diagram illustrating a system that provides a protected kernel environment, in accordance with various examples of the present disclosure.

FIG. 1 is an organizational diagram illustrating a system that provides a protected kernel environment, in which various aspects of the present disclosure may be implemented.

The system 100 includes a host machine 102. The host machine 102 includes host hardware 104. Host hardware 104 includes physical elements such as a processor 106, memory 108, and may also include other input/output (I/O) devices, such as those illustrated in FIG. 4.

The host machine 102 includes a hypervisor 110, which also may be referred to as a virtual machine monitor. Hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

In the present example, hypervisor 110 provides one or more virtual machines, such as the virtual machine 112 and virtual machine(s) 122. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including providing access of virtual machines (e.g., virtual machine 112 and virtual machine(s) 122) to the host hardware 104, such as processor 106, memory 108, and other hardware devices. In some examples, the system resources that may be provided to each virtual machine include a virtual CPU that is mapped to the processor 106, guest memory that is mapped to a portion of the memory 108, one or more virtual devices that are mapped to other host hardware 104, such as a network device, an emulated NIC or disk, virtual firmware, and so forth.

In the present example, a kernel 114 runs on the virtual machine 112 provided by the hypervisor 110. The kernel 114 provides core computing functionality to the virtual machine 112. For example, kernel 114 is structured to manage important tasks, such as allocating guest memory 118, sending and receiving 110, managing a file system provided to the guest 116, handling interrupts, scheduling and running processes to execute instructions of computing tasks, providing an interface between devices and software applications, and/or providing other fundamental computing features.

In the present example, the virtual machine 112 includes a one or more additional kernels 120. The additional kernel(s) 120 may be structured as one or more kernels that may be executed instead of kernel 114. These additional kernels 120 may each provide the same, similar or different functionality than the kernel 114. The system 100 is structured to transition execution between the kernel 114 and the additional kernel(s) 120, and/or between kernels of the additional kernels (120). In the present example, the system 100 is structured to perform the transitions between kernels without requiring a reboot/restart of the virtual machine 112 or the host machine 102. For example, the kernel 114 may be structured to be loaded and executed by a boot loader during a boot process performed on the virtual machine 112. The virtual machine 112 and hypervisor 110 are structured to transition execution from the kernel 114 to the additional kernel(s) 120 while the virtual machine 112 is running and without shutting down or rebooting the virtual machine 112. In some examples, the virtual machine includes a software component such as KEXEC that may be used in combination with one or more other features provided by the virtual machine 112 and hypervisor 110 to perform the transitioning.

In the present example, the virtual machine 112 is structured with a guest 116 that is built on top of the kernel 114 and relies upon the kernel 114 for allocating portions of the guest memory 118 to the guest 116 (and its applications) and executing instructions of the guest 116 (and its applications). The guest 116 may also be referred to as a guest operating system. Examples of guests include, for example, LINUX, UNIX, DOS, OS/2, IOS, ANDROID, WINDOWS, and so forth. These guests all include, at their core, a kernel (such as kernel 114) that handles allocation of memory and runs processes to execute instructions. The guest 116 may include features such as user interfaces (such as desktop and/or command line interfaces), file systems, server applications, database management systems, and various other user applications that may be preinstalled on the guest 116 or added after installation of the guest 116.

Each virtual machine 122 may be similarly structured with a guest operating system built on top of a kernel, and a guest memory that may have portions allocated to the kernel, the guest operation system, and/or other applications.

The host machine 102 may execute a host operating system. The guest 116 running on a virtual machine 112 may include a same or a different operating system as a host operating system running on the host machine 102. For example, the guest 116 may provide an operating system that is accessed locally on the host machine 102 as a default operating environment of the host machine 102. In other examples, the host machine 102 is structured with an operating system that is separate from the guest 116, and the guest 116 is provided in addition to the host machine's operating system. Accordingly, the host machine 102 may run multiple operating systems concurrently and in isolation from other operating systems. Moreover, the guest operating systems of the host machine 102, virtual machine 112 and virtual machine(s) 112 may be homogenous or heterogeneous. That is, the guest operating systems may all be one type (e.g., LINUX) or may be different types (e.g., guest 116 may be RED HAT ENTERPRISE LINUX, and a virtual machine of the virtual machine(s) may include a guest that is provided by a non-LINUX vendor).

The hypervisor 110 provides a guest memory 118 that is allocated to the kernel 114, guest 116, additional kernel(s) 120 and/or other applications running on the virtual machine 112. In the present example, the guest memory 118 is structured as a virtualized portion of the memory 108. The guest memory 118 may include one or more guest memory pages that are mapped to memory pages of the memory 108 via one or more mappings, such as page tables. The mapping(s) may be provided by the hypervisor 110. In some examples, the page tables are host page tables, which may include, for example, Extended Page Tables (EPT), shadow page tables, or hypervisor page tables. Accordingly, the hypervisor 110 is structured with access to the guest memory 118 to virtualize the memory 108 and provide the guest memory 118 to the virtual machine 112.

Further, the hypervisor 110 may also virtualize other areas of memory 108 for the virtual machines(s) 122 that are not included in the guest memory 116. These other areas of memory may therefore be inaccessible to the kernel 114 and/or guest 116. For example, the hypervisor 110 may also be structured to provide other guest memories to each of the virtual machine(s) 122 that are isolated from other guest memories. Accordingly, the hypervisor 110 is structured with access to the memory 108 to allocate and provide guest memory (e.g., guest memory 118 and/or other guest memories provided to the virtual machine(s) 122).

The guest memory 118 and/or memory 108 may be structured to implement various access privileges (e.g., read access, write access, and/or execute access) that may be enabled and/or disabled via one or more flags or other data structures that are maintained corresponding to the memory pages and/or page mappings. For example, page tables, such as the EPT, may be accessed by the hypervisor 110 to enable/add and/or disable/remove access privileges corresponding to the memory pages in the guest memory. For example, the EPT may include a page table entry corresponding to each memory page in the guest memory 118. Each page table entry may include values that may be modified to enable and/or disable access privileges of the kernel 114, guest 116, additional kernel(s) 120, and other programs running on the virtual machine 112. The hypervisor 110 is structured to modify the access privileges to allow or prohibit particular access types (e.g., read, write, and/or execute access) for particular memory pages and memory addresses of the guest memory 118.

In the present example, the virtual machine 112 is structured to provide a protected kernel environment, which may prevent read, write, and/or execute access to portions of the guest memory 118, such as portions of the guest memory that are allocated to the kernel 114 and/or the additional kernel(s) 120. For example, the hypervisor 110 and/or virtual machine 112 may be structured to include KERNEL GUARD TECHNOLOGY (KGT), which protects memory pages and/or page entries corresponding to the kernel 114 and/or additional kernel(s) 120 from being written to and/or executed. In some examples, the protected kernel environment is triggered by the kernel 114 to cause the hypervisor 110 to modify access privileges for portions of the guest memory 118. For example, the protected kernel environment may be provided by the hypervisor 110 removing/disabling write and/or execute access privileges to portions of the guest memory 118 that are allocated for use by the kernel 114 and/or additional kernel(s) 120. In some examples, activation of the protected kernel environment is triggered by the kernel 114 executing a hypercall to request that the hypervisor 110 modify the access privileges corresponding to particular portions of the guest memory 116.

The hypervisor 110 is structured to maintain this access to the guest memory 118, including page table entries corresponding to memory pages allocated to the kernel 114 and the additional kernel(s) 120, even while the protected kernel environment is implemented, so that the hypervisor 110 may modify access privileges and otherwise manage and control the execution of the virtual machine 112.

Figure 2:
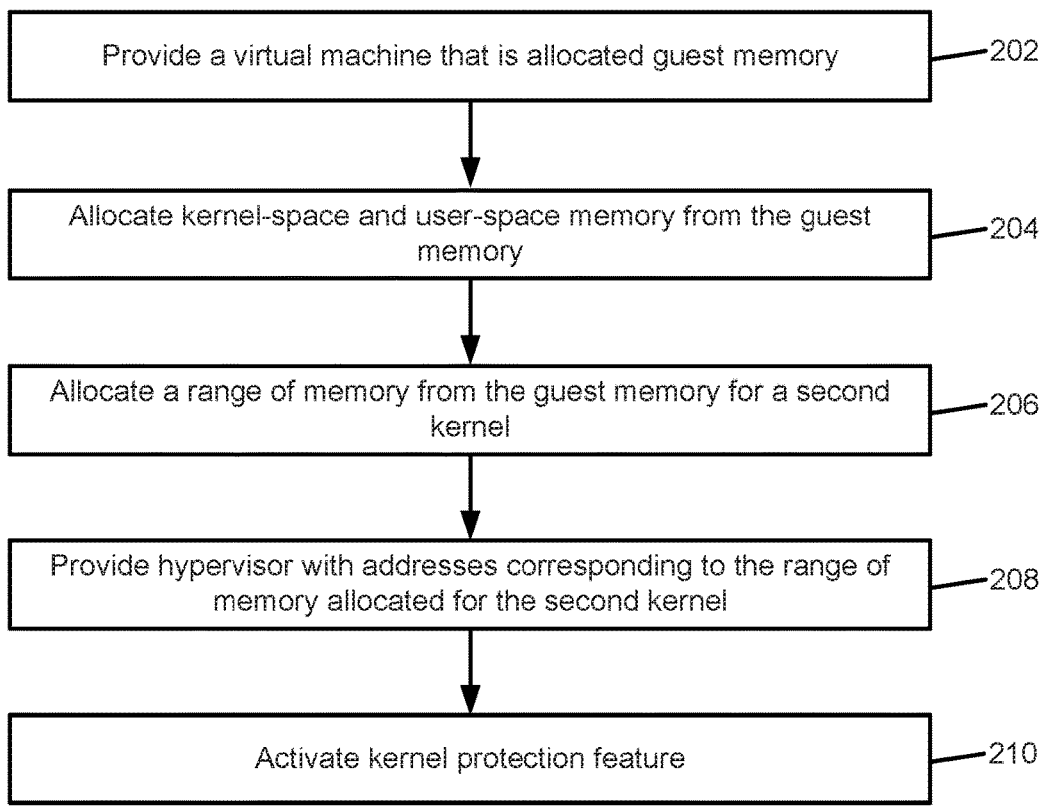
FIG. 2 is a flow diagram illustrating providing of an additional kernel in a protected kernel environment, in accordance with various examples of the present disclosure.

FIG. 2 is a flow diagram illustrating providing of an additional kernel in a protected kernel environment, according to some examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 202, the hypervisor is executed to provide a virtual machine. The hypervisor allocates a portion of a host memory for use by the virtual machine. This allocated portion may include one or more contiguous and/or non-contiguous ranges of memory addresses from the host memory. In some examples, the portion of the host memory that is allocated to the virtual machine is referred to as a guest memory. In some examples, the allocating includes creating and/or modifying one or more page entries by the hypervisor to map memory addresses of the host memory to memory addresses of the guest memory.

At action 204, a kernel is executed on the virtual machine to allocate portions of the guest memory for use by the kernel and for use by other programs running on the virtual machine, such as a guest operating system and/or other user programs. In some examples, the portion of the guest memory allocated to the kernel is referred to as kernel-space, and the portion of the guest memory allocated to the guest operating system and other programs is referred to as user-space. The portions allocated for kernel-space and user-space may include contiguous and/or non-contiguous memory address ranges from the guest memory.

At action 206, the kernel allocates one or more contiguous and/or non-contiguous memory ranges of the guest memory and stores instructions corresponding to a second kernel in the allocated memory. In some examples, the portion of the guest memory that is allocated for the second kernel is allocated from the kernel-space portion of the guest memory that was previously allocated for use by the kernel.

At action 208, the kernel provides, to the hypervisor, one or more memory addresses corresponding to the memory range allocated for storing the second kernel. The kernel may communicate the one or more memory addresses to the hypervisor in many ways, such as, via hypercalls, system calls, shared memory, and/or interrupts. In some examples, a starting memory address and/or offset corresponding to the memory range are provided to the hypervisor in addition to a size of the memory range. In other examples, addresses of one or more memory pages corresponding to the memory range are provided to the hypervisor. In yet other examples, starting and ending memory addresses corresponding to the memory range are provided to the hypervisor.

At action 210, a kernel protection feature is activated to modify access privileges corresponding to the kernel and/or second kernel. The kernel protection feature may disable/remove write access to the memory allocated to the kernel, thereby write-protecting the kernel from being modified. In the present example, the kernel protection feature is provided by the hypervisor to also disable/remove write and execute access privileges corresponding to the memory allocated to the second kernel.

In the present example, the disabling/removing of write and execute access privileges corresponding to the second kernel prevents writing to or executing the second kernel by any program running on the virtual machine. For example, the kernel, guest operating system running on top of the kernel, and/or other applications on the virtual machine are prevented by the kernel protection feature from executing the second kernel or writing to the memory range allocated to the second kernel. In more detail, regarding the disabling of write privileges, the kernel protection feature may prevent write operations from being performed to modify (1) memory pages that are allocated to the second kernel and/or (2) page mappings (such as page table entries) that correspond to the memory pages that are allocated to the second kernel.

The virtual machine that includes the activated kernel protection feature may be referred to as a protected kernel environment. In some examples, the kernel protection feature is activated by the virtual machine executing a hypercall that requests that the hypervisor activate the kernel protection feature. The hypervisor may provide the kernel protection feature by performing operations such as modifying one or more page table entries to disable/remove read, write, and/or execute access privileges to portions of the guest memory.

In some examples, the modifying of the page table entries is performed by the hypervisor setting one or more flags or updating one or more variables corresponding to the memory pages of the guest memory to indicate that particular portions of the guest memory are non-writable and/or non-executable (e.g., that the particular portions are read-only). In some examples, the flag(s) variables may be modified by the hypervisor changing values of one or more bits in one or more page table entries, such as host page table entries.

The kernel protection feature described herein is merely one example of an implementation of a kernel protection feature. In other examples, a kernel protection feature may include one or more other kernel protection features similar to and/or different than the kernel protection feature discussed above.

Figure 3:
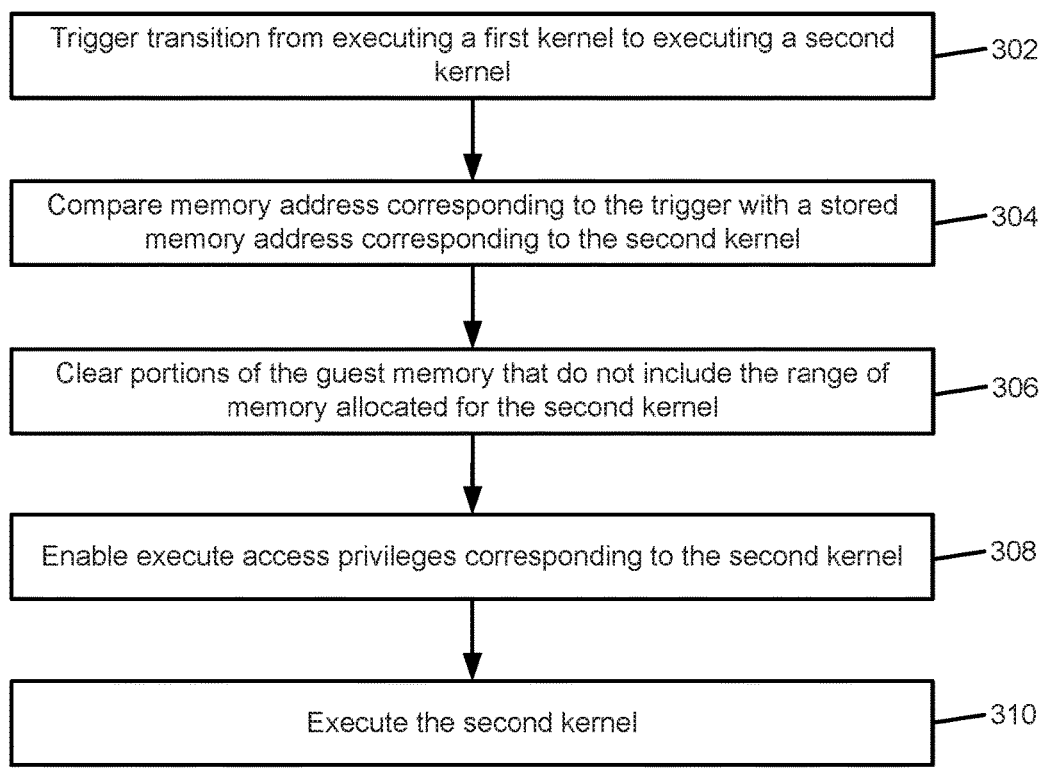
FIG. 3 is a flow diagram illustrating transitioning execution between kernels in a protected kernel environment, in accordance with various examples of the present disclosure.

FIG. 3 is a flow diagram illustrating transitioning execution between kernels in a protected kernel environment, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 302, a transition from executing a first kernel to executing an alternate kernel is triggered. In this example, the kernel is referred to as a first kernel and the alternate kernel is referred to as a second kernel. In some examples, there are additional kernels, such that execution may also be transitioned from the second kernel to a third kernel, and so forth.

In some examples, the transition is triggered by executing a hypercall instruction on the virtual machine that provides the first kernel. The hypercall may request that one or more operations be performed by the hypervisor to transition execution to the second kernel. The hypercall may include or reference one or more memory addresses corresponding to the second kernel.

In other examples, the transition is triggered by providing a handler at a hypervisor that is configured to respond to attempted execution of the second kernel. In this example, the virtual machine may attempt to execute one or more instructions corresponding to the second kernel. However, because the memory range allocated to the second kernel has been set by the hypervisor to be non-executable by the virtual machine, the attempted execution of the one or more instructions fails and a page fault occurs. The page fault causes an exception to be generated by a processor. The hypervisor includes a handler that is registered to handle the exception. This handler may be registered in an Interrupt Descriptor Table (IDT). Using the information provided by the IDT, the processor locates the handler and passes control from the virtual machine to the hypervisor so that the hypervisor may perform operations provided in its handler to respond to the exception. The exception generated by the processor may provide the hypervisor with one or more memory addresses corresponding to the attempted execution.

In yet other examples, the transition is triggered by a Virtual Machine Exit (VMEXIT) operation. In this example, the virtual machine may attempt to execute one or more instructions corresponding to the second kernel. However, because the memory range allocated to the second kernel has been set by the hypervisor to be non-executable by the virtual machine, the attempted execution of the one or more instructions fails and a page fault occurs. Responsive to a page fault, the processor switches execution from the virtual machine to the hypervisor using the VMEXIT operation. The processor may provide the hypervisor with one or more memory addresses corresponding to the attempted execution.

The transition may be triggered in other ways in addition to the examples specifically discussed above, and the transition is not limited to these examples.

At action 304, the hypervisor compares the one or more memory addresses received at action 302 with one or more stored memory addresses corresponding to the second kernel. For example, the one or more stored memory addresses may be the memory address(es) and/or memory range received at action 208. Accordingly, the hypervisor may verify that the action 302 trigger corresponds to the second kernel.

At action 306, the hypervisor clears/erases portions of the guest memory that do not include the range of memory allocated for the second kernel. These cleared portions may include portions of the guest memory allocated to the first kernel and/or portions of the guest memory allocated for a user-space. In some examples, the hypervisor clears all of the guest memory allocated to the virtual machine except for the memory range allocated for the second kernel.

In some examples, the hypervisor clears the portions of the guest memory by marking memory pages invalid. For example, for the memory pages in the guest memory that do not correspond to the second kernel, the hypervisor may access page table entries corresponding to the memory pages to mark the memory pages as invalid. The page table entries may be included, for example, in a host page table. The marking of the memory pages as invalid may be performed by modifying a flag or other valid/invalid indicator in the accessed page table entries. Accordingly, once invalidated, the memory pages may be reallocated and reused for other purposes, such as for allocation to the second kernel. In other examples, clearing of the memory may be performed in other ways.

At action 308, the hypervisor enables execution of the second kernel. In some examples, the hypervisor modifies the access privileges corresponding to the memory range where the second kernel is stored. The access privileges may be modified to add/provide execute access privileges for the virtual machine for instructions stored in the memory range, such that the second kernel may be executed on the virtual machine. In some examples, the modifying of the access privileges is performed by the hypervisor setting a flag and/or indicator corresponding to the memory addresses of the memory range to indicate that the memory addresses are executable. In some examples, the flag and/or other indicator may include one or more bits in entries of page tables, such as the host page tables. Accordingly, instructions of the second kernel are rendered executable on the virtual machine.

At action 310, the hypervisor and/or virtual machine executes the second kernel. In some examples, the hypervisor and/or virtual machine may execute a program such as KEXEC to execute the second kernel on the virtual machine. In the present example, the hypervisor transfers control back to the virtual machine so that the virtual machine may execute the second kernel. The second kernel may allocate cleared portions of the guest memory for its own use and/or for use as user-space (e.g., to provide memory for a guest operating system and/or other user programs). Thus, the portions of guest memory previously allocated for the first kernel may be reused by the second kernel.

Figure 4:
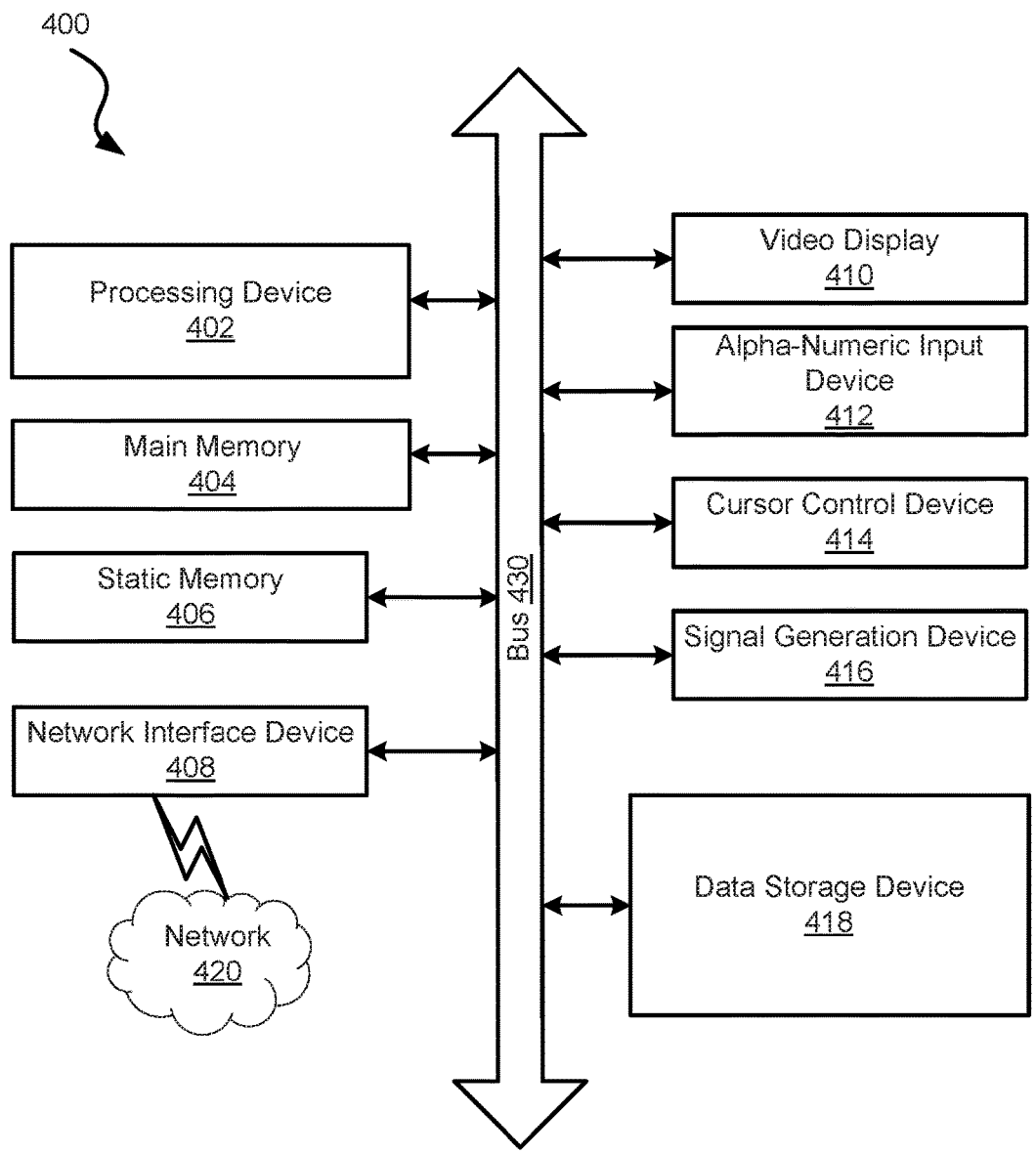
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 122.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for providing multiple kernels in a protected kernel environment, the method comprising:
   providing, by a hypervisor, a virtual machine that includes a first kernel and a second kernel;
   allocating a first portion of memory for the first kernel and a second portion of memory for the second kernel;
   executing the first kernel that is stored in the first portion of memory;
   disabling, by the hypervisor, access privileges corresponding to the second portion of memory; and
   transitioning from executing the first kernel to executing the second kernel, wherein the transitioning from the first kernel to the second kernel occurs while the virtual machine is running and without shutting down or rebooting the virtual machine, the transitioning comprising:
   clearing, by the hypervisor, at least some of the first portion of memory;
   enabling, by the hypervisor, access privileges corresponding to the second portion of the memory; and
   after the enabling, executing the second kernel on the virtual machine.

2. The method of claim 1, further comprising:
   prior to the disabling, providing the hypervisor with a memory range corresponding to the second portion of the memory.

3. The method of claim 1, wherein the disabling access privileges comprises modifying one or more host page table entries to indicate that memory pages corresponding to the second portion of memory are non-executable.

4. The method of claim 1, wherein the transitioning is triggered by the hypervisor responding to a page fault caused by an attempted execution of the second kernel while access privileges are disabled.

5. The method of claim 1, wherein the transitioning is triggered by the virtual machine executing a hypercall instruction.

6. The method of claim 1, wherein the clearing at least some of the first portion of memory comprises clearing all kernel-space and user-space memory corresponding to the virtual machine, with the exception of the second portion of memory.

7. The method of claim 1, wherein the clearing at least some of the first portion of the memory comprises modifying, by the hypervisor, one or more host page table entries to indicate that memory pages corresponding to the first portion of memory are invalid.

8. The method of claim 1, wherein the enabling access privileges comprises modifying one or more host page table entries to indicate that memory pages corresponding to the second portion of memory are executable.

9. The method of claim 1, wherein the second kernel is executed to store data in the at least some of the first portion of memory that was cleared by the hypervisor.

10. A non-transitory machine-readable medium having stored thereon machine-readable instructions executable to cause a machine to perform operations comprising:
   providing, by a hypervisor, a virtual machine that includes a first kernel and a second kernel;
   allocating a first portion of memory for the first kernel and a second portion of memory for the second kernel;
   executing the first kernel that is stored in the first portion of memory;
   disabling, by the hypervisor, access privileges corresponding to the second portion of memory; and
   transitioning from executing the first kernel to executing the second kernel, wherein the transitioning from the first kernel to the second kernel occurs while the virtual machine is running and without shutting down or rebooting the virtual machine, the transitioning comprising:
      clearing, by the hypervisor, at least some of the first portion of memory;
      enabling, by the hypervisor, access privileges corresponding to the second portion of the memory; and
      after the enabling, executing the second kernel on the virtual machine.

11. The non-transitory machine-readable medium of claim 10, wherein the transitioning is triggered by the hypervisor responding to a page fault caused by an attempted execution of the second kernel while access privileges are disabled.

12. The non-transitory machine-readable medium of claim 10, wherein the transitioning is triggered by the virtual machine executing a hypercall instruction.

13. The non-transitory machine-readable medium of claim 10, wherein the clearing at least some of the first portion of memory comprises clearing all kernel-space and user-space memory corresponding to the virtual machine, with the exception of the second portion of memory.

14. The non-transitory machine-readable medium of claim 10, wherein the clearing at least some of the first portion of the memory comprises modifying, by the hypervisor, one or more host page table entries to indicate that memory pages corresponding to the first portion of memory are invalid.

15. A system comprising:
   a non-transitory machine readable medium that includes a first portion of memory allocated for a first kernel and a second portion of memory allocated for a second kernel; and
   one or more hardware processors coupled to the non-transitory memory and configured to read instructions from the non-transitory memory to cause the system to perform operations comprising:
      providing, by a hypervisor, a virtual machine;
      executing the first kernel on the virtual machine;
      disabling, by the hypervisor, access privileges corresponding to the second portion of memory; and
      transitioning from executing the first kernel to executing the second kernel, wherein the transitioning from the first kernel to the second kernel occurs while the virtual machine is running and without shutting down or rebooting the virtual machine, the transitioning comprising:
         clearing, by the hypervisor, at least some of the first portion of memory;
         enabling, by the hypervisor, access privileges corresponding to the second portion of the memory; and
         after the enabling, executing the second kernel on the virtual machine.

16. The system of claim 15, wherein the transitioning is triggered by the hypervisor responding to a page fault caused by an attempted execution of the second kernel while access privileges are disabled.

17. The system of claim 15, wherein the transitioning is triggered by the virtual machine executing a hypercall instruction.

18. The system of claim 15, wherein the clearing at least some of the first portion of memory comprises clearing all kernel-space and user-space memory corresponding to the virtual machine, with the exception of the second portion of memory.

19. The system of claim 15, wherein the clearing at least some of the first portion of the memory comprises modifying, by the hypervisor, one or more host page table entries to indicate that memory pages corresponding to the first portion of memory are invalid.

20. The system of claim 15, wherein the disabling access privileges comprises modifying one or more host page table entries to indicate that memory pages corresponding to the second portion of memory are non-executable; and
   wherein the enabling access privileges comprises modifying the one or more host page table entries to indicate that the memory pages corresponding to the second portion of memory are executable.

* * * * *